(12) United States Patent
Gervasi et al.

(10) Patent No.: US 8,076,427 B2
(45) Date of Patent: Dec. 13, 2011

(54) RELEASE FLUID COMPOSITIONS

(75) Inventors: David J. Gervasi, Penfield, NY (US); George Riehle, Webster, NY (US); Samuel Kaplan, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 293 days.

(21) Appl. No.: 12/352,483

(22) Filed: Jan. 12, 2009

(65) Prior Publication Data

US 2009/0111953 A1   Apr. 30, 2009

Related U.S. Application Data

(62) Division of application No. 11/175,101, filed on Jul. 5, 2005, now Pat. No. 7,494,756.

(51) Int. Cl.
*C08G 77/26* (2006.01)

(52) U.S. Cl. ............ 525/478; 525/477; 528/15; 528/31; 528/38

(58) Field of Classification Search .................. 525/478, 525/477; 528/15, 31, 38
See application file for complete search history.

(56) References Cited

U.S. PATENT DOCUMENTS

| | | |
|---|---|---|
| 4,029,827 A | 6/1977 | Imperial et al. |
| 4,101,686 A | 7/1978 | Strella et al. |
| 4,185,140 A | 1/1980 | Strella et al. |
| 4,257,699 A | 3/1981 | Lentz |
| 4,264,181 A | 4/1981 | Lentz et al. |
| 4,272,179 A | 6/1981 | Seanor |
| 4,515,884 A | 5/1985 | Field et al. |
| 5,017,432 A | 5/1991 | Eddy et al. |
| 5,061,965 A | 10/1991 | Ferguson et al. |
| 5,166,031 A | 11/1992 | Badesha et al. |
| 5,281,506 A | 1/1994 | Badesha et al. |
| 5,366,772 A | 11/1994 | Badesha et al. |
| 5,370,931 A | 12/1994 | Fratangelo et al. |
| 5,401,570 A | 3/1995 | Heeks et al. |
| 5,698,320 A | 12/1997 | Ebisu et al. |
| 5,716,747 A | 2/1998 | Uneme et al. |
| 6,103,848 A * | 8/2000 | Decker et al. ............ 528/21 |
| 6,384,172 B1 * | 5/2002 | Dvornic et al. ............ 528/15 |
| 6,808,815 B2 | 10/2004 | Kaplan et al. |
| 6,829,466 B2 | 12/2004 | Finn et al. |
| 6,830,819 B2 | 12/2004 | Kaplan et al. |
| 2003/0212234 A1 * | 11/2003 | Dvornic et al. ............ 528/33 |

OTHER PUBLICATIONS

Gong, Caiguo et al., "Intramolecular Cyclization in the Polymerization of ABx Monomers: Approaches to the Control of Molecular Weight and Polydispersity in Hyperbranched Poly(siloxysilane)," Journal of Polymer Science, John Wiley & Sons, Inc., p. 3193-3201, (1999).

Gong, Caiguo et al., "End Functionalization of Hyperbranched Poly(siloxysilane): Novel Crosslinking Agents and Hyperbranched-Linear Star Block Copolymers," Journal of Polymer Science, John Wiley & Sons, Inc., p. 2970-2978, ( 2000).

* cited by examiner

*Primary Examiner* — Margaret Moore
(74) *Attorney, Agent, or Firm* — Pillsbury Winthrop Shaw Pittman LLP

(57) ABSTRACT

Use of release fluids or agents constituting hyperbranched polymers. The three-dimensional structure imparts characteristics that make the hyperbranched polymers useful in xerographic processes. The hyperbranched polymer release fluids or agents may be used with a fuser member having a substrate, an outer layer covering the substrate, and a release coating on the outer layer, wherein the release coating includes a hyperbranched polymer.

11 Claims, 1 Drawing Sheet

RELEASE FLUID COMPOSITIONS

RELATED APPLICATIONS

The application is a Divisional of U.S. application Ser. No. 11/175,101, filed Jul. 5, 2005, now U.S. Pat. No. 7,494,756, which is expressly incorporated by reference.

BACKGROUND

The presently disclosed embodiments are directed to release fluids or agents that are useful in release coating in toner-based technologies. More particularly, the embodiments pertain to the use of hyperbranched polymers with three-dimensional structures in release fluids for an improved contact fusing system to fix toner images to a substrate.

In electrostatographic reproducing apparatuses, including digital, image on image, and contact electrostatic printing apparatuses, a light image of an original to be copied is typically recorded in the form of an electrostatic latent image upon a photosensitive member and the latent image is subsequently rendered visible by the application of electroscopic thermoplastic resin particles and pigment particles, or toner. The residual toner image can be either fixed directly upon the photosensitive member or transferred from the member to another support, such as a sheet of plain paper with subsequent fixing or fusing.

In order to fix or fuse the toner material onto a support member permanently by heat, it is usually necessary to elevate the temperature of the toner material to a point at which the constituents of the toner material coalese and become tacky. This heating action causes the toner to flow to some extent into the fibers or pores of the support member. Thereafter, as the toner material cools, solidification of the toner material causes the toner material to be bonded firmly to the support member.

Typically, the thermoplastic resin particles are fused to the substrate by heating to a temperature of from about 90 degrees Celsius to about 200 degrees Celsius or higher, depending on the softening range of the particular resin used in the toner. It may be undesirable, however, to increase the temperature of the substrate substantially higher than about 250 degrees Celsius because the substrate may discolor or convert into fire at such elevated temperatures, particularly when the substrate is paper.

Several approaches to thermal fusing of electroscopic toner images have been described. These methods include providing the application of substantial heat and pressure concurrently by various means, including fuser members such as a roll pair maintained in pressure contact, a belt member in pressure contact with a roll, a belt member in pressure contact with a heater, and the like. Heat can be applied by heating one or both of the rolls, plate members, belt members, or the like. The fuser member can be in the form of a roller, drum, belt, sheet, film, drelt (a hybrid between a roll and a belt), and the like. The fusing of the toner particles occurs when the proper combination of heat, pressure, and/or contact for the optimum time period are provided. The balancing of these variables to bring about the fusing of the toner particles can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important that minimal or no offset of the toner particles from the support to the fuser member takes place during normal operations. Toner particles that offset onto the fuser member can subsequently transfer to other parts of the machine or onto the support in subsequent copying cycles, increasing the image background, and causing inadequate copy quality, inferior marks on the copy, interference with the material being copied, and toner contamination of other parts of the machine. Such problems, known as "hot offset," occur when the temperature of the toner is increased to a point where the toner particles liquefy and a splitting of the molten toner takes place with a portion remaining on the fuser member. The hot offset temperature or degradation of the hot offset temperature directly impacts the release properties of the fuser member. Accordingly, it is desirable to provide a fusing surface with low surface energy to provide the necessary release. To ensure and maintain good release properties of the fuser member, release fluids may be applied to the fuser member during the fusing operation to prevent toner offset.

U.S. Pat. No. 4,257,699 to Lentz, the subject matter of which is hereby incorporated by reference in its entirety, discloses a fuser member comprising at least one outer layer of an elastomer containing a metal-containing filler and use of a polymeric release agent.

U.S. Pat. No. 4,264,181 to Lentz et al., the subject matter of which is hereby incorporated by reference in its entirety, discloses a fuser member having an elastomer surface layer containing metal-containing filler therein and use of a polymeric release agent.

U.S. Pat. No. 4,272,179 to Seanor, the subject matter of which is hereby incorporated by reference in its entirety, discloses a fuser member having an elastomer surface with a metal-containing filler therein and use of a mercapto-functional polyorganosiloxane release agent.

U.S. Pat. No. 5,401,570 to Heeks et al., the subject matter of which is hereby incorporated by reference in its entirety, discloses a fuser member comprised of a substrate and a silicone rubber surface layer over the substrate containing a filler component, wherein the filler component is reacted with a silicone hydride release agent.

U.S. Pat. No. 4,515,884 to Field et al., the subject matter of which is hereby incorporated by reference in its entirety, discloses a fuser member having a silicone elastomer-fusing surface, which is coated with a toner release agent, which includes an unblended polydimethyl siloxane.

Different types of release fluids or agents can be used to provide sufficient release. However, the sufficiency of the release depends on the selected release fluid or agent and an appropriate combination of the fuser member surface material and any filler to be incorporated into the fuser member surface material. Despite using appropriate combinations, however, commonly used release fluids or agents, such as those including conventional linear polymers, sometimes still do not provide sufficient release for the toner image.

One approach to the problem is through the use of polymeric release agents having functional groups, either at the chain-end or pendant to the linear chain. The reactivity of functional groups with the surfactants of the fuser member, such as long chain fluorinated acid, helps facilitate robust and uniform incorporation into the release fluid so that rapid wetting of the fluid onto a roller surface is promoted. The use of these polymeric agents, which interact with a fuser member to form a thermally stable, renewable self-cleaning layer having good release properties for electroscopic thermoplastic resin toners, is described in U.S. Pat. Nos. 4,029,827; 4,101,686; and 4,185,140, the disclosures each of which are incorporated by reference herein in their entirety. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids. U.S. Pat. No. 5,716,747 discloses the use of fluorine-containing silicone fluids for use on fixing rollers with outermost layers of ethylene tetrafluoride perfluoro alkoxyethylene copolymer, polytetrafluoroethylene and polyfluoroethylene-propylene copolymer. U.S. Pat. No. 5,698,320 discloses the use of fluorosilicone polymers for use on fixing rollers with outermost layers of perfluoroalkoxy and tetra-fluoroethylene resins.

However, there are still some problems associated with the use of the above release agents. Common problems include inducement of swelling of fuser member surface coatings, insufficient wetting of fuser members, poor toner adhesion to the support, and poor interaction with the fillers in the fuser members. Additionally, various compositions that have been proposed for treating fuser roll and belt substrates to impart release properties suffer from thermal instability when heated to fusing temperatures, for example, about 150 degrees Celsius and above, for short periods of time of, for example, about 0.5 seconds and longer. Thermal degradation of these release fluids or agents and related derivatives may result in the generation of volatile byproducts.

Thus, while known compositions and processes are suitable for their intended purposes, there remains a need for improved release fluids or agents to help facilitate sufficient release of the fuser member and substantially prevent toner offset. For example, a need remains for release fluids or agents that react well with the surfaces commonly used in fusing systems, without the problems mentioned above, including systems using solid ink jet transfix printing processes.

SUMMARY

According to aspects illustrated herein, there is provided a release fluid comprising a hyperbranched polymer. The hyperbranched polymer has a three-dimensional structure. One embodiment of the present invention includes a hyperbranched polymer that is poly(siloxysilane).

An embodiment may include: a fuser member comprising a substrate; an outer layer covering the substrate; and a release coating on the outer layer, wherein the release coating includes a hyperbranched polymer which is the sol-gel product of structures represented by the following Formula I:

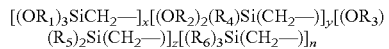
$(R_5)_2Si(CH_2\text{—})]_z[(R_6)_3Si(CH_2\text{—})]_n$ where $R_1$, $R_2$, and $R_3$ are selected from the group consisting of H, $CH_3$, alkyl, aryl, alkylaryl, trimethylsilane, dimethylsilane, methylsilane, a nonfunctional polysiloxane oligomer or polymer, or an amine-, mercapto-, or fluorine-containing polysiloxane oligomer or polymer; $R_4$, $R_5$, and $R_6$, are selected from the group consisting of $CH_3$, alkyl, aryl, alkylaryl, alkylamino, alkylmercapto, fluoroalkyl; x=0-400, y=0-400, z=0-400, n=0-400; x+y+z+n is selected so that the final sol-gel product achieves a fluid viscosity of from about 10 cS to about 1000 cS. Note that since the structures represented by Formula I are prepared by a hydrosilation reaction involving a silicone hydride and a vinyl group, some of the $CH_2$— groups in Formula I could be replaced by unreacted H or $CH=CH_2$. In some embodiments, the composition of the outer layer may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers. In a particular embodiment, $R_1$, $R_2$ and $R_3$ are methyl or ethyl groups and $R_4$, $R_5$ and $R_6$ are methyl groups. The release coating may also further include a linear siloxane polymer either co-reacted in the sol-gel reaction with Formula I or blended with the sol-gel product of structures represented by Formula I.

Another embodiment may further include: an image forming apparatus for forming images on a recording medium comprising: a charge-retentive surface to receive an electrostatic latent image thereon; a development component to apply a developer material to the charge-retentive surface to develop the electrostatic latent image to form a developed image on the charge-retentive surface; a transfer component to transfer the developed image from the charge retentive surface to a copy substrate; and a fuser member component to fuse the transferred developed image to the copy substrate, wherein the fuser member comprises: a substrate; an outer layer covering the substrate; and a release coating on the outer layer; wherein the release coating includes a hyperbranched polymer which is the sol-gel product of structures represented by the following Formula I:

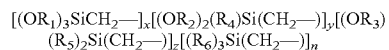
$(R_5)_2Si(CH_2\text{—})]_z[(R_6)_3Si(CH_2\text{—})]_n$ where $R_1$, $R_2$, and $R_3$ are selected from the group consisting of H, $CH_3$, alkyl, aryl, alkylaryl, trimethylsilane, dimethylsilane, methylsilane, a nonfunctional polysiloxane oligomer or polymer, or an amine-, mercapto-, or fluorine-containing polysiloxane oligomer or polymer; $R_4$, $R_5$, and $R_6$, are selected from the group consisting of $CH_3$, alkyl, aryl, alkylaryl, alkylamino, alkylmercapto, fluoroalkyl; x=0-400, y=0-400, z=0-400, n=0-400; x+y+z+n is selected so that the final sol-gel product achieves a fluid viscosity of from about 10 cS to about 1000 cS. Note that since the structures represented by Formula I are prepared by a hydrosilation reaction involving a silicone hydride and a vinyl group, some of the $CH_2$— groups in Formula I could be replaced by unreacted H or $CH=CH_2$. Again, in some embodiments, the composition of the outer layer may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers. In a particular embodiment, $R_1$, $R_2$ and $R_3$ are methyl or ethyl groups and $R_4$, $R_5$ and $R_6$ are methyl groups. The release coating may also further include a linear siloxane polymer either co-reacted in the sol-gel reaction with Formula I or blended with the sol-gel product of structures represented by Formula I.

In embodiments, an outer layer comprising a fluoroelastomer may further be selected from the group consisting of 1) copolymers of two of vinylidene fluoride, hexafluoropropylene and tetrafluoroethylene; 2) terpolymers of vinylidene fluoride, hexafluoropropylene and tetrafluoroethylene; and 3) tetrapolymers of vinylidene fluoride, hexafluoropropylene, tetrafluoroethylene, and a cure site monomer.

BRIEF DESCRIPTION OF THE DRAWINGS

For a better understanding of the present invention, reference may be had to the accompanying figures.

DETAILED DESCRIPTION

Figure 1:
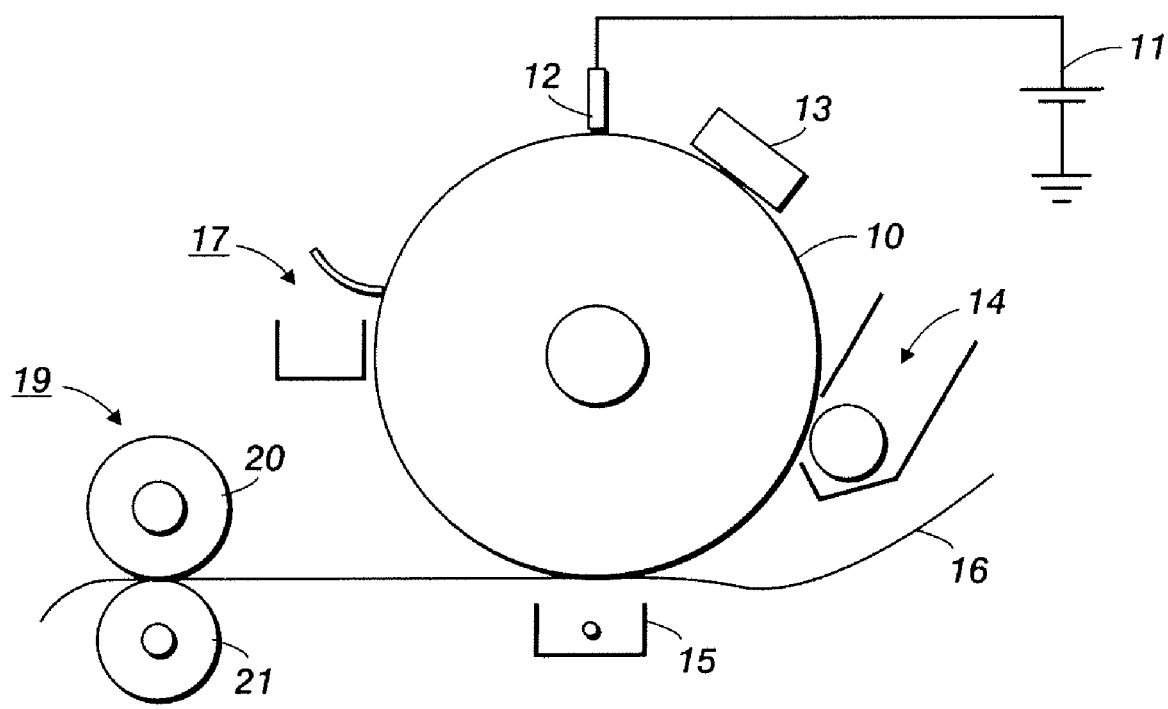
FIG. 1 is a schematic illustration of an image apparatus in accordance with the present invention.

In the following description, reference is made to the accompanying drawings, which form a part hereof and which illustrate several embodiments of the present invention. It is understood that other embodiments may be utilized and structural and operational changes may be made without departure from the scope of the present invention.

Embodiments of the present invention relate to fuser members having a release fluid or agent in combination therewith. The fuser member can be in the form of a roller, drum, belt, sheet, film, drelt (a hybrid between a roll and a belt), and the like. The fuser member may have an outer layer in combination with a hyperbranched polymer release fluid, for example, a release fluid including poly(siloxysilane). The combination, in embodiments, allows for sufficient wetting of the fuser member to facilitate sufficient release of the fuser member and prevent toner offset. While most polymers are not temperature stable in the ranges required for the described applications, release fluids containing silicon-based and fluorinated polymers are fluids that may withstand such temperatures.

Hyperbranched poly(siloxysilane)s and poly(alkoxysilane)s are mostly formed through a hydrosilation reaction involving a silicone hydride and a vinyl group. The synthesis of these polymers may be achieved in greater proportions by using a divergent method involving repetitive addition of a stoichiometric amount of monomer in a process designed to mimic generation growth. Another approach involves changing the ratio of the $AB_x$ monomer to be added to the B monofunctional molecule. Yet another approach involves slow monomer addition or seeded polymerizations in which the monomer is slowly added to a "core" or pre-formed polymer, with the post-addition of a fresh catalyst, or the use of new $AB_3$, $AB_4$ and $AB_6$ monomers or even the post-addition of a fresh monomer. These approaches to building hyperbranched silicone-based polymers are described in The Journal of Polymer Science: Part A Polymer Chemistry Vol. 37, 3193-3201 (1999), Intramolecular Cyclization in the Polymerization of $AB_x$ Monomers: Approaches to the Control of Molecular Weight and Polydispersity in Hyperbranched Poly(siloxysilane).

An example may include monomer 3, an $AB_2$ monomer that is readily obtained from dichlorovinylmethylsilane (1) and chlorodimethylsilane (2) in a process that might be easily scaled in accordance with Scheme 1:

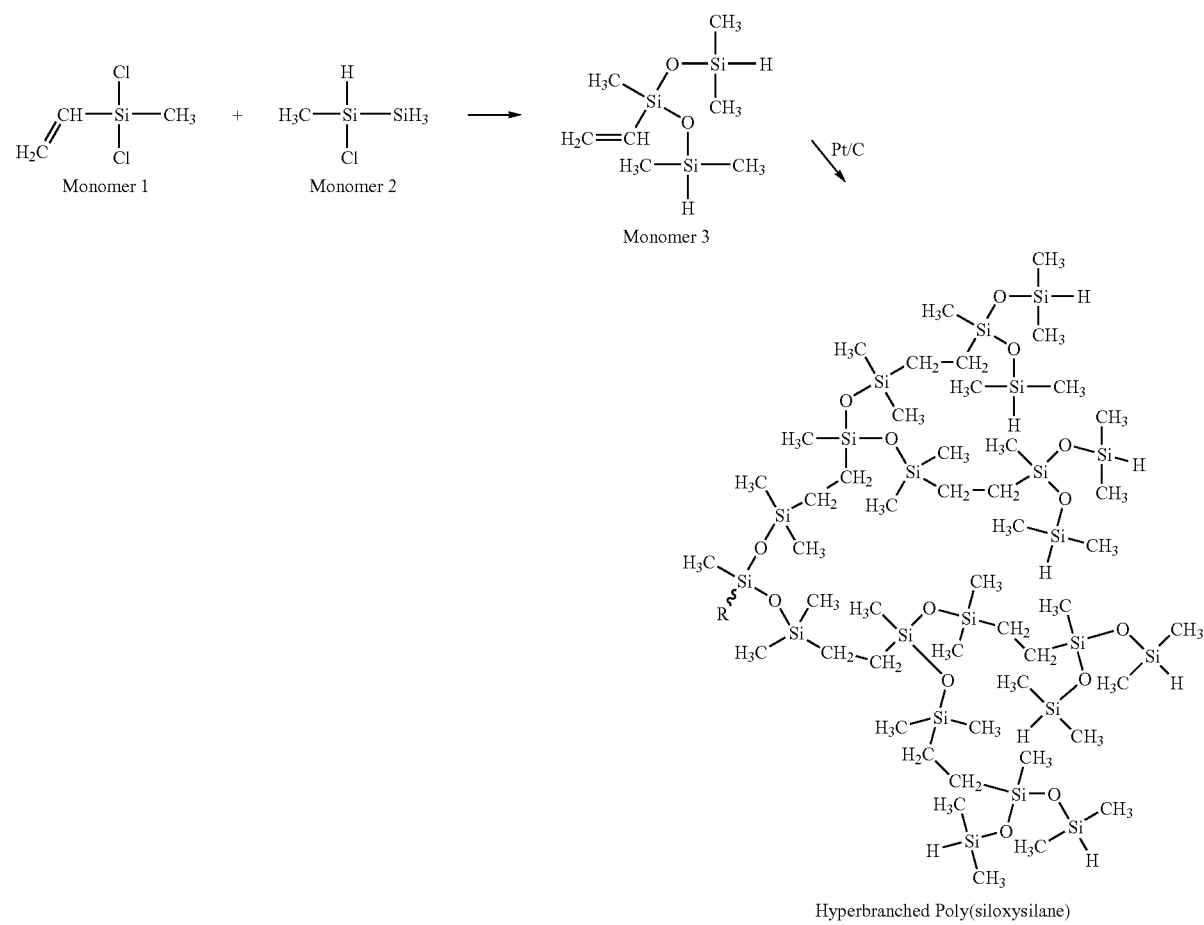

Hyperbranched Poly(siloxysilane)

Addition of a catalytic amount of platinum to monomer 3, as shown above, causes the formation of hyperbranched poly (siloxysilane) through repeated hydrosilation reactions. After the desired molecular weight is achieved, the polymerization reaction may be halted by introducing a monomer containing no hydride functionality (such as monomer 3a, shown below) to inhibit further hydrosilation:

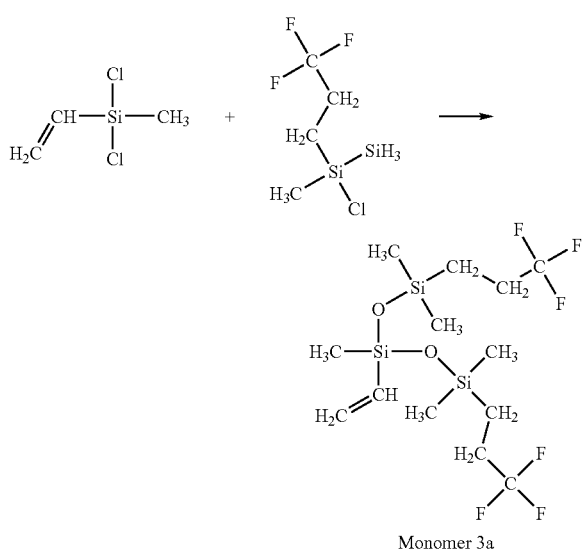

Monomer 3a

The resulting hyperbranched poly(siloxysilane) has numerous advantages including, low viscosity with low volatility, higher reactivity, improved surface coverage and wettability for a variety of materials. Hyperbranched polymers have a lower viscosity as compared to linear polymers of similar molecular weight due to higher chain mobility and lower entanglements. For example, a release fluid that does not include hyperbranched polymers may have a viscosity in the range of about 200 to 1000 centistokes (cS). If a hyperbranched polymer is included in the composition, however, the viscosity is reduced to a range of about 100 to 600 cS. In addition, the hyperbranched poly(siloxysilane) has a higher molecular weight that is desirable in creating a barrier or release layer thicker than those related to linear, low-viscosity release fluids.

In one embodiment of the hyperbranched polymer, comprised of poly(siloxysilane), the three-dimensional structure of the polymer enhances a contact fusing system because it allows the release fluid to spread sufficiently over the fuser member, and thus, increases fuser member life. The three-dimensional structure of poly(siloxysilane) also provides improved properties and performance to the release fluids, by imparting improved solubility and compatibility with other polymers in the fusing system. The hyperbranched poly(siloxysilane) polymer also produces a release coating that has reduced viscosity without the volatility associated with typical low viscosity, which improves the ease of processing and enhances wetting coverage. The lower viscosity allows improved metering for the release fluid as compared to a linear polydimethylsiloxane (PDMS) of similar molecular weight.

Referring to FIG. 1, in a typical electrostatic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor 10 is then imagewise exposed to light from an optical system or an image input apparatus 13, such as a laser and light emitting diode, to form an electrostatic latent image on the photoreceptor 10. Generally, the electrostatic latent image is developed by bringing a developer mixture from developer station 14 into contact herewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing member components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
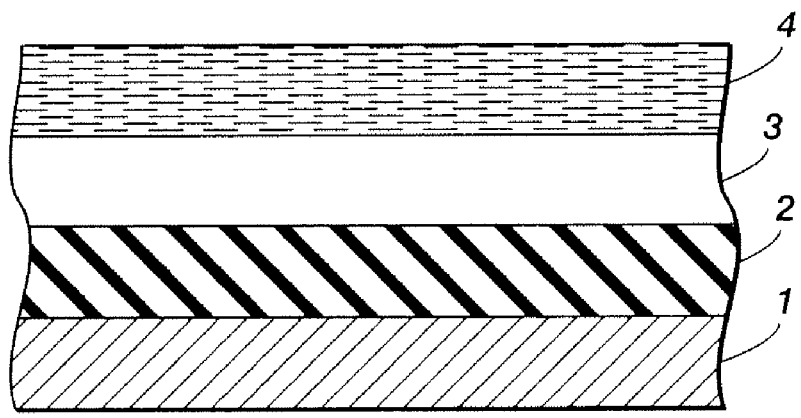
FIG. 2 is an enlarged, side view of an embodiment of a fuser member, showing a fuser member with a substrate, intermediate layer, outer layer, and release coating layer.

FIG. 2 is an enlarged schematic view of an embodiment of a fuser member, demonstrating the various possible layers. As shown in FIG. 2, substrate 1 includes an intermediate layer 2. Intermediate layer 2 can be, for example, a rubber such as silicone rubber or other suitable rubber material. On the intermediate layer 2 is positioned an outer layer 3. Positioned on the outer layer 3 is an outermost release layer 4 including the hyperbranched polymer. The outer layer composition may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers. The thickness of the outer layer of the fuser member may be from about 1 to about 50 micrometers, or from about 5 to about 20 micrometers.

Examples of the outer surface of the fuser system members include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, are known commercially under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromo-perfluorobutene-1,3-bromoperfluoro-propene-1,1,1-dihydro-3-bromoperfluoro-propene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylenetetra-fluoroethylene) and FLUOREL II® (LII900) a poly(propylene-tetrafluoroethylene-vinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in solution in the outer layer solutions, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers. In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the outer layer, in order to provide anchoring sites for the functional groups of the release fluid. Some suitable fillers include, for example, copper oxide, aluminum oxide, lead oxide, and zinc oxide. However, a filler is not necessary for use with all fuser systems, such as one that uses fluorosilicone as the release fluid.

Optional intermediate adhesive layers and/or intermediate polymer or elastomer layers may be applied to achieve desired properties and performance objectives of the embodiments of the present invention. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

There may also be provided an adhesive layer between the substrate and the intermediate layer. There may also be an adhesive layer between the intermediate layer and the outer layer. In the absence of an intermediate layer, the outer layer may be bonded to the substrate via an adhesive layer. The thickness of the intermediate layer is from about 0.5 to about 20 mm, or from about 1 to about 5 mm.

The release fluids or agents described herein are provided onto the outer layer of the fuser member via a delivery mechanism such as a delivery roll. The delivery roll is partially immersed in a sump, which houses the release fluid or agent.

The release fluids or agents, constituting hyperbranched polymers, are renewable in that the release fluid or agent is housed in a holding sump and provided to the fuser roll when needed, optionally by way of a release fluid donor roll in an amount of from about 0.1 to about 20 mg/copy, or from about 1 to about 12 mg/copy. The system by which fuser release fluid is provided to the fuser roll via a holding sump and, optionally, a donor roll is well known. The release fluid may be present on the fuser member surface in a continuous or semi-continuous phase. The release fluid in the form of a film is in a continuous phase and continuously covers the fuser member.

Examples of suitable hyperbranched polymers for the release fluids include poly(siloxysilane), wherein the polymer includes 250-300 silicone atoms. In embodiments, examples of hyperbranched poly(siloxysilane) release coating includes a hyperbranched polymer which is the sol-gel product of structures represented by the following Formula I:

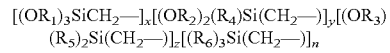

where $R_1$, $R_2$, and $R_3$ are selected from the group consisting of H, $CH_3$, alkyl, aryl, alkylaryl, trimethylsilane, dimethylsilane, methylsilane, a nonfunctional polysiloxane oligomer or polymer, or an amine-, mercapto-, or fluorine-containing polysiloxane oligomer or polymer; $R_4$, $R_5$, and $R_6$, are selected from the group consisting of $CH_3$, alkyl, aryl, alkylaryl, alkylamino, alkylmercapto, fluoroalkyl; x=0-400, y=0-400, z=0-400, n=0-400; x+y+z+n is selected so that the final sol-gel product achieves a fluid viscosity of from about 10 cS to about 1000 cS. Note that since the structures represented by Formula I are prepared by a hydrosilation reaction involving a silicone hydride and a vinyl group, some of the $CH_2$— groups in Formula I could be replaced by unreacted H or $CH=CH_2$. In some embodiments, the composition of the outer layer may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers. In a particular embodiment, $R_1$, $R_2$ and $R_3$ are methyl or ethyl groups and $R_4$, $R_5$ and $R_6$ are methyl groups. The release coating may also further include a linear siloxane polymer either co-reacted in the sol-gel reaction with Formula I or blended with the sol-gel product of structures represented by Formula I.

A specific example of a poly(siloxysilane) group in the hyperbranched polymer release fluid may be one wherein the hyperbranched polymer has approximately 250 silicone atoms, and corresponds to a viscosity of 300 cS.

A specific example of a poly(siloxysilane) release fluid is one having the following Formula II:

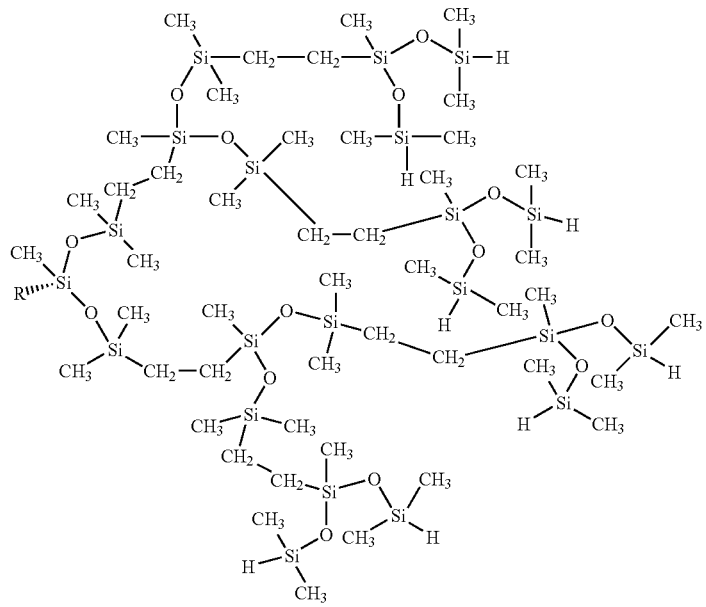

where R represents a further chain extension. In the above formula, the total length of the polymer chain includes approximately 150-300 silicone atoms, which corresponds to a viscosity of 300 cS. In other embodiments, the poly(siloxysilane) release fluid has a viscosity of from about 10 to about 1000 cS, or from about 100 to about 600 cS.

In embodiments, the hyperbranched polymer containing a siloxy backchain with pendant R groups of Formulas I or II can be present in a non-functional or organofunctional release fluid. In embodiments, the poly(siloxysilane) polymer containing pendant R groups as in Formulas I through II above, may be present in the release fluid in amounts of form about 1 to about 100 percent, 1 to about 50 percent, or from about 1 to about 25 percent, or about 15 percent. However, the above formulas can also be used in non-blended form where they would encompass 100 percent of the release fluid.

The hyperbranched polymer release fluid or agent can be prepared as a copolymer with a functional release agent such as an amine-functional PDMS via copolymerization of amine-containing silane monomers or cyclics with dichloro-containing silane monomers or cyclics. For the case of a copolymer of alkyl and amine pendant groups, the amine groups are present at a level that ranges from 0.01 percent to about 2 percent or from about 0.05 percent to about 1 percent. The alkyl functional groups are present at a level which ranges from about 98 percent to about 99.99 percent or from about 99 percent to about 99.95 percent.

Alternatively, the hyperbranched polymer can be prepared as a release fluid through copolymerization with linear polymers. For the blend of hyperbranched and linear polymers, the linear polymers can be present at a level which ranges from about 25 percent to about 90 percent or from about 50 percent to about 75 percent. The hyperbranched polymers are present at a level which ranges from about 10 percent to about 75 percent or from about 25 percent to about 50 percent. The linear polymers may be copolymerized with the hyperbranched polymer according to the general viscosity equation:

$$\ln \eta_{Blend} = \phi_{component1} \ln \eta_{component1} + \phi_{component2} \ln \eta_{component2} + \ldots + \phi_{componentm} \ln \eta_{componentm}.$$

In another embodiment, a blend of about 1 percent to about 50 percent, or about 1 percent to about 25 percent of a hyperbranched polymer, such as a poly(siloxysilane) polymer in a functional or non-functional silicone fluid, can be used to combine the advantages of both types of individual fluids. For example, in a blend of hyperbranched and linear polymers, the resulting release fluid or agent can facilitate reactivity with the fluoroelastomer substrate while a physical or chemical compatibility in the fluid contributes to excellent surface wetting characteristics. The poly(siloxysilane) release fluid can be blended with a non-functional silicone agent, such as a non-functional PDMS.

A non-functional agent, as used herein, refers to agents that do not interact or chemically react with the surface of the fuser member or with fillers on the surface. A functional agent, as used herein, refers to a release fluid having functional groups which chemically react with the fillers present on the surface of the fuser member, so as to reduce the surface energy of the fillers and to provide better release of toner particles from the surface of the fuser member. If the surface energy is not reduced, the toner particles will tend to adhere to the fuser roll surface or to filler particles on the surface of the fuser roll, which will result in copy quality defects. The release fluid may be used with both functional and non-functional agents, depending on the fuser surface.

In the above embodiments, the various R groups pendant to the siloxy backchain interact to fold the polymer into a three-dimensional structure. The blending of the hyperbranched polymer with linear polymers imparts a different three-dimensional structure. The resulting three-dimensional structure is different from the resulting structure from cross-linking linear polymers, which remains linear. Three dimensional or hyperbranched silicone fluids may have a competitive and functional advantage over conventional linear fluids, both in xerographic and direct marking printing systems.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Poly(siloxysilane) Release Fluid

A Poly(siloxysilane) Release Fluid is synthesized in a manner described herein, or by other suitable means. The resulting polymer is approximately 300 cs and contains amine functionality of 1.0 mole % amine relative to the silicon atoms in the concentrated structure. This concentrated amine-functional hyperbranched polymer is then blended 1:9 with a non-functional linear PDMS, which also has a viscosity of 300 cs. The resulting fluid is 300 cs and has an amine functionality of 0.1 mole percent. The resulting fluid can then be utilized as a release agent in a fuser subsystem or offset process transfix subsystem exhibiting enhanced release performance as compared to other release agent compositions commonly used in the art.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A release fluid comprising a linear polymer and an amine-functional hyperbranched polymer having the structure of Formula I:

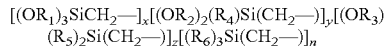

wherein $R_1$, $R_2$, and $R_3$ are selected from the group consisting of H, $CH_3$, alkyl, aryl, alkylaryl, trimethylsilane, dimethylsilane, methylsilane, a polysiloxane oligomer or polymer, or an amine-, mercapto-, or fluorine-containing polysiloxane oligomer or polymer; $R_4$, $R_5$, and $R_6$, are selected from the group consisting of $CH_3$, alkyl, aryl, alkylaryl, alkylamino, alkylmercapto, fluoroalkyl; x=0-400, y=0-400, z=0-400, n=0-400, wherein at least one of x, y, z, and n is greater than 0 and x+y+z+n is selected so that the hyperbranched polymer achieves a fluid viscosity of from about 10 cSt to about 1000 cSt at room temperature; the hyperbranched polymer being present in an amount of from about 25 percent to about 50 percent of the release fluid, wherein said hyperbranched polymer reduces viscosity of the release fluid to substantially prevent toner offset.

2. The release fluid of claim 1, wherein the hyperbranched polymer is present in an amount of from about 25 percent to about 50 percent of the release fluid.

3. The release fluid of claim 1, wherein the linear polymer is present in an amount of from about 50 percent to about 75 percent of the release fluid and the hyperbranched polymer is present in an amount of from about 25 percent to about 50 percent of the release fluid.

4. The release fluid of claim 1, wherein the hyperbranched polymer is selected from the group consisting of poly(siloxysilane) and poly(alkoxysilane).

5. The release fluid of claim 1, wherein the linear polymer is present in an amount of from about 50 percent to about 75 percent of the release fluid.

6. The release fluid of claim 1, wherein the amine-functional hyperbranched polymer is present in an amount of from about 25 percent to about 50 percent of the release fluid.

7. The release fluid of claim 1, wherein the amine-functional hyperbranched polymer is selected from the group consisting of poly(alkoxysilane) and poly(alkoxysilane).

8. The release fluid of claim 1 having a viscosity of from about 10 cSt to about 1000 cSt at room temperature.

9. The release fluid of claim 6, wherein the amine groups of the amine-functional hyperbranched polymer are present at a level that ranges from about 0.01 percent to about 2 percent in the amine-functional hyperbranched polymer.

10. A release fluid comprising a combination of a linear polymer and a hyperbranched polymer having the structure of Formula I:

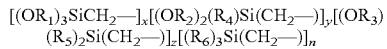

wherein $R_1$, $R_2$, and $R_3$ are selected from the group consisting of H, $CH_3$, alkyl, aryl, alkylaryl, trimethylsilane, dimethylsilane, methylsilane, a polysiloxane oligomer or polymer, or an amine-, mercapto-, or fluorine-containing polysiloxane oligomer or polymer; $R_4$, $R_5$, and $R_6$, are selected from the group consisting of $CH_3$, alkyl, aryl, alkylaryl, alkylamino, alkylmercapto, fluoroalkyl; x=0-400, y=0-400, z=0-400, n=0-400; and x+y+z+n is selected so that the hyperbranched polymer achieves a fluid viscosity of from about 10 cSt to about 1000 cSt at room temperature, the linear polymer being present in an amount of from about 25 percent to about 90 percent and the hyperbranched polymer being present in an amount of from about 10 percent to about 75 percent of the release fluid, wherein the hyperbranched polymer reduces viscosity of the release fluid to substantially prevent toner offset and further wherein the hyperbranched polymer comprises the partial structure of Formula II:

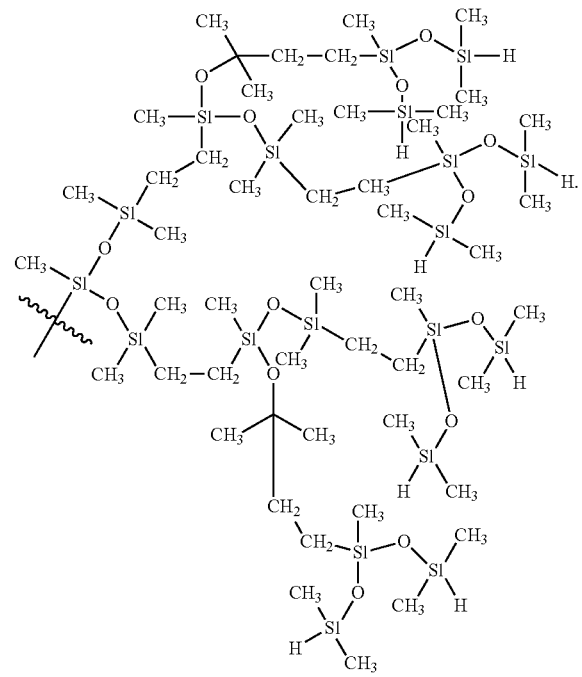

11. The release fluid of claim 10, wherein the hyperbranched polymer comprises from 250 to 300 silicone atoms.

* * * * *